United States Patent [19]

Haney et al.

[11] 4,184,425
[45] Jan. 22, 1980

[54] SELF-PROPELLED MODULE BUILDER

[75] Inventors: Donald J. Haney, San Jose; Franklin P. Orlando, Morgan Hill, both of Calif.

[73] Assignee: Cotton Machinery Company, Inc., Livermore, Calif.

[21] Appl. No.: 2,320

[22] Filed: Jan. 10, 1979

[51] Int. Cl.² .................... B30B 1/32; B30B 15/32
[52] U.S. Cl. .................... 100/100; 100/218; 100/226; 100/269 R; 180/24.07; 180/89.1; 280/43.17
[58] Field of Search ........... 100/100, 218, 226, 269 R; 280/43.17, 43.23, 81 R; 180/24.07, 24.05, 24.06, 24.08, 24.09, 12, 13, 89.1

[56] References Cited

U.S. PATENT DOCUMENTS

| | | | |
|---|---|---|---|
| 2,748,879 | 6/1956 | Bailey | 180/24.07 |
| 3,027,959 | 4/1962 | Mailliard | 180/24.07 |
| 3,784,218 | 1/1974 | Stone | 280/43.23 |
| 3,879,049 | 4/1975 | Husky | 100/100 X |
| 3,941,047 | 3/1976 | Orlando | 100/100 |
| 4,036,304 | 7/1977 | Crow | 180/24.07 |
| 4,049,071 | 9/1977 | Stedman | 180/24.07 |
| 4,063,745 | 12/1977 | Olson | 280/43.23 |
| 4,074,784 | 2/1978 | Lee | 180/24.07 |

Primary Examiner—Billy J. Wilhite
Attorney, Agent, or Firm—Jack M. Wiseman

[57] ABSTRACT

A self-propelled module builder comprising a frame in which cotton or other compressible material is deposited. A compacting mechanism is mounted on the open top of the frame to compress the material into a module. The frame has a side frame structure on each side thereof. Each side frame structure includes a walking beam that is pivotally connected centrally between the ends thereof by an hydraulic jack, which is pivotally attached to the adjacent side frame structure. The ends of the walking beam are connected by pins to parallel spindle tubes. Each spindle tube is constrained for vertical sliding movement by an upright guide, which is fixed to the associated side frame structure. Drive wheels are mounted at the lower ends of the spindle tubes through respective spindles. With the frame lowered, a module is made on the ground to be transported to a suitable facility. When the rectangular frame is raised, the module builder is capable of traveling to another location. On each spindle tube is mounted a motor to drive the associated drive wheel through a sprocket and chain arrangement. Thus, each drive wheel is driven by an independent motor, while the module builder retains the full action of a walking beam. A retractable front wheel serves as a steering wheel for the module builder.

12 Claims, 13 Drawing Figures

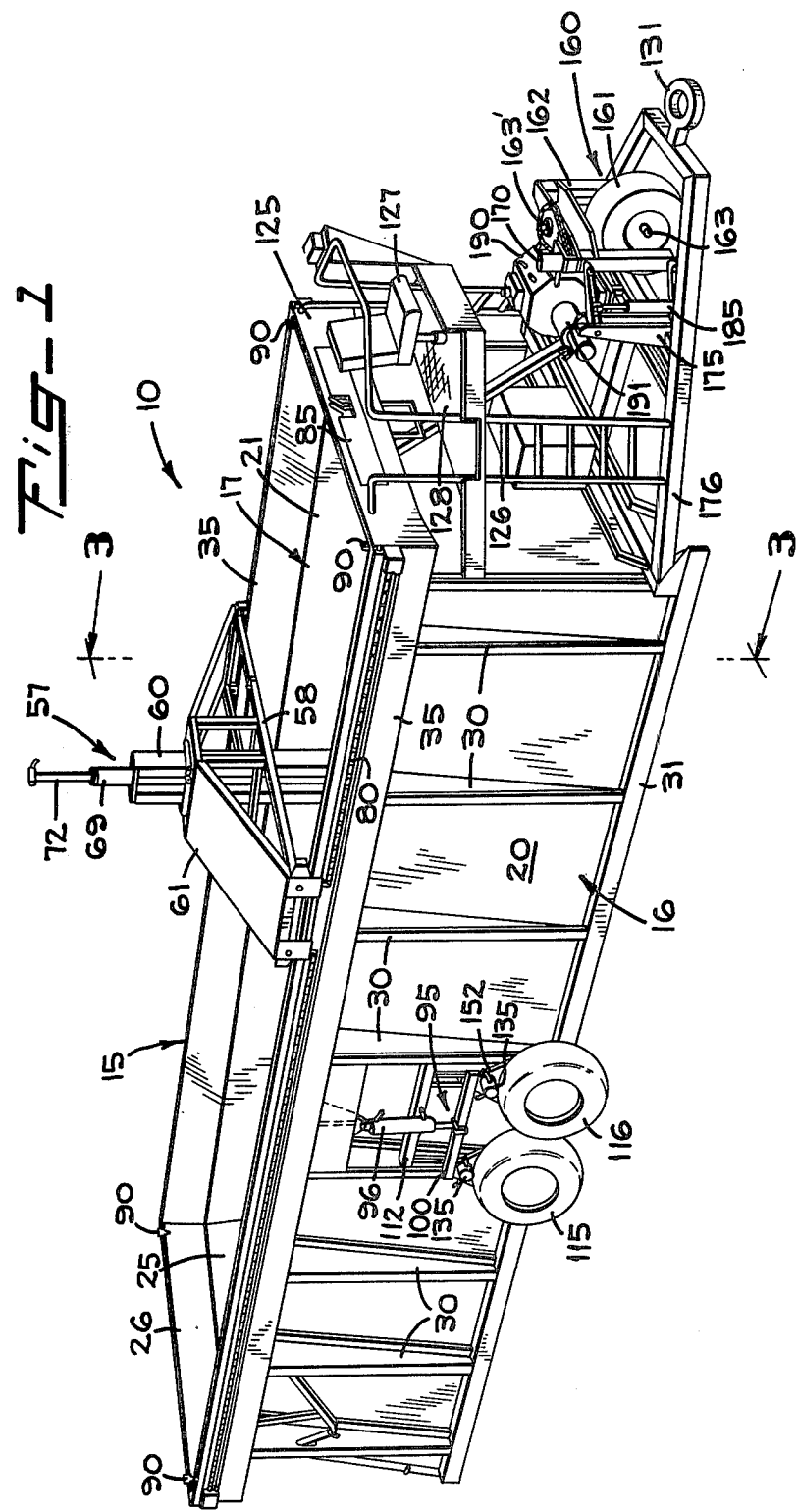

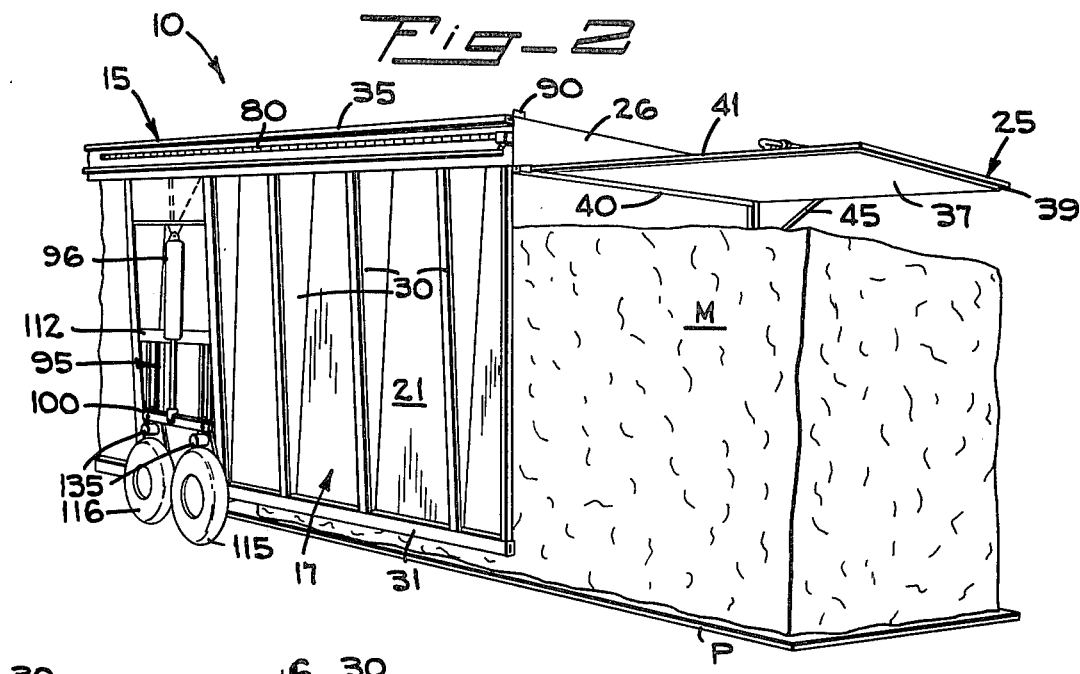
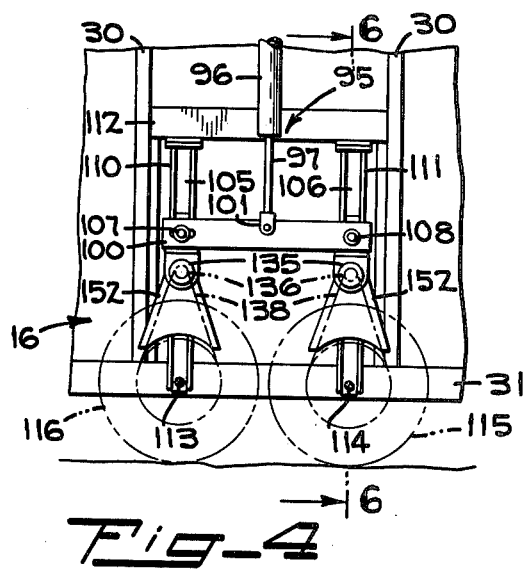
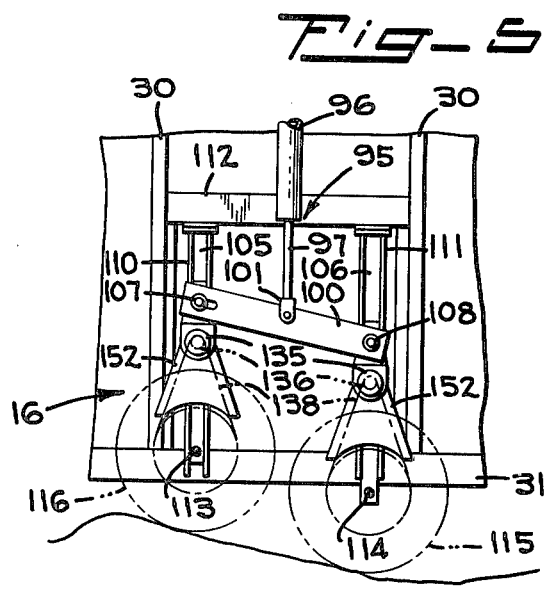

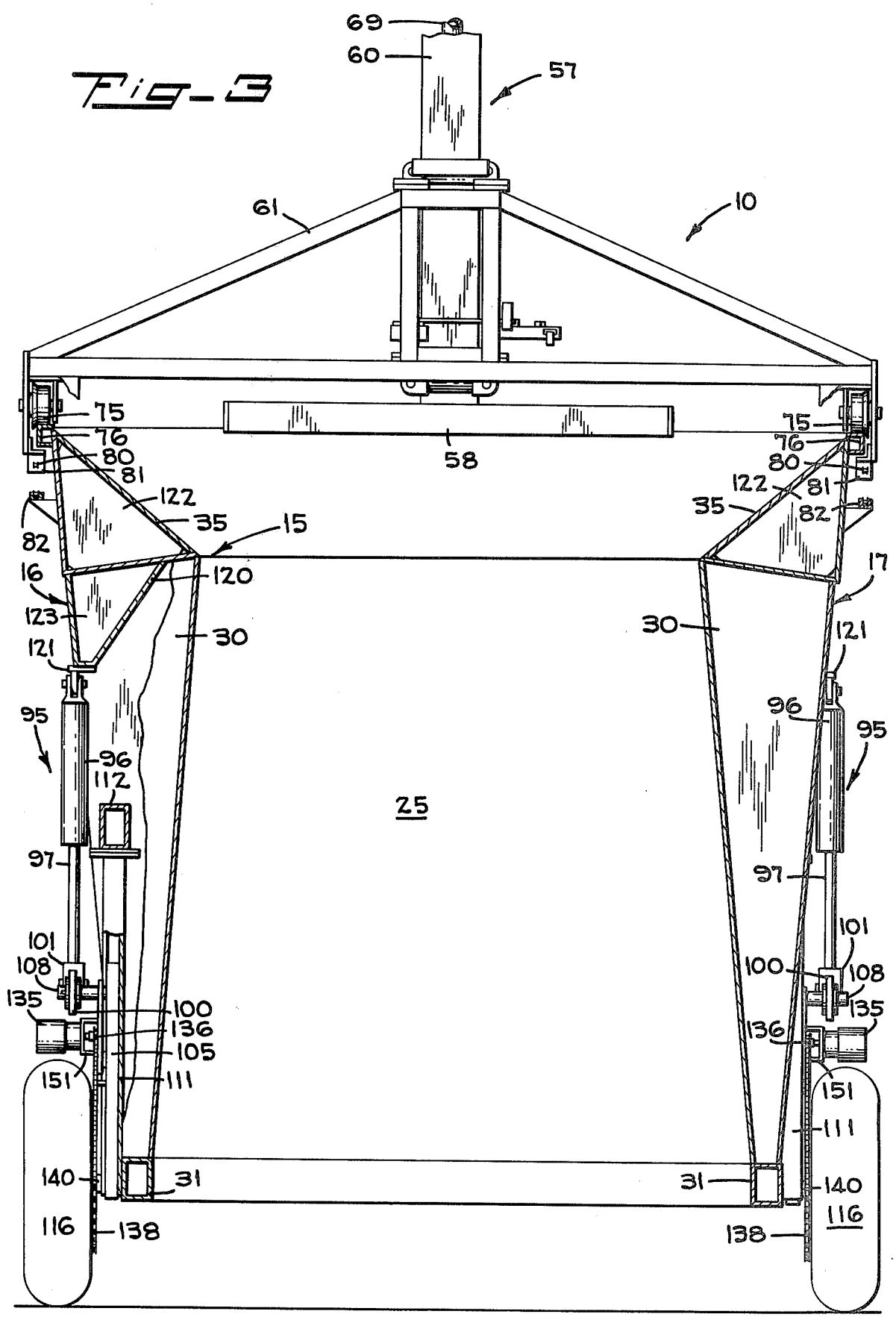

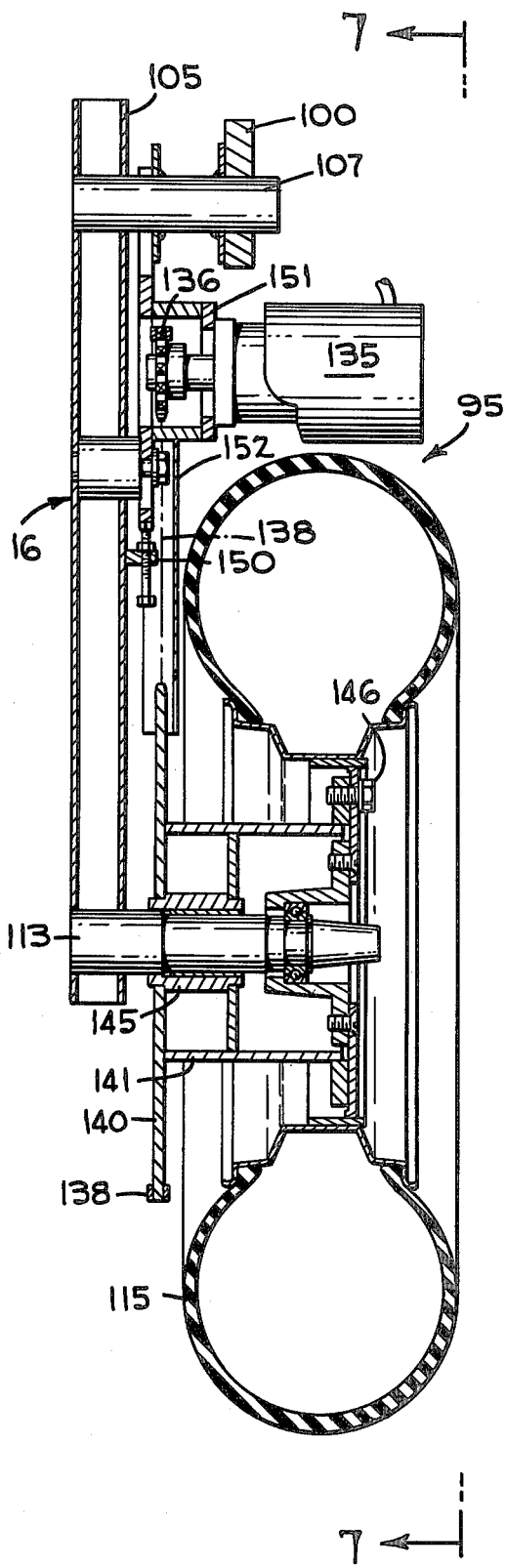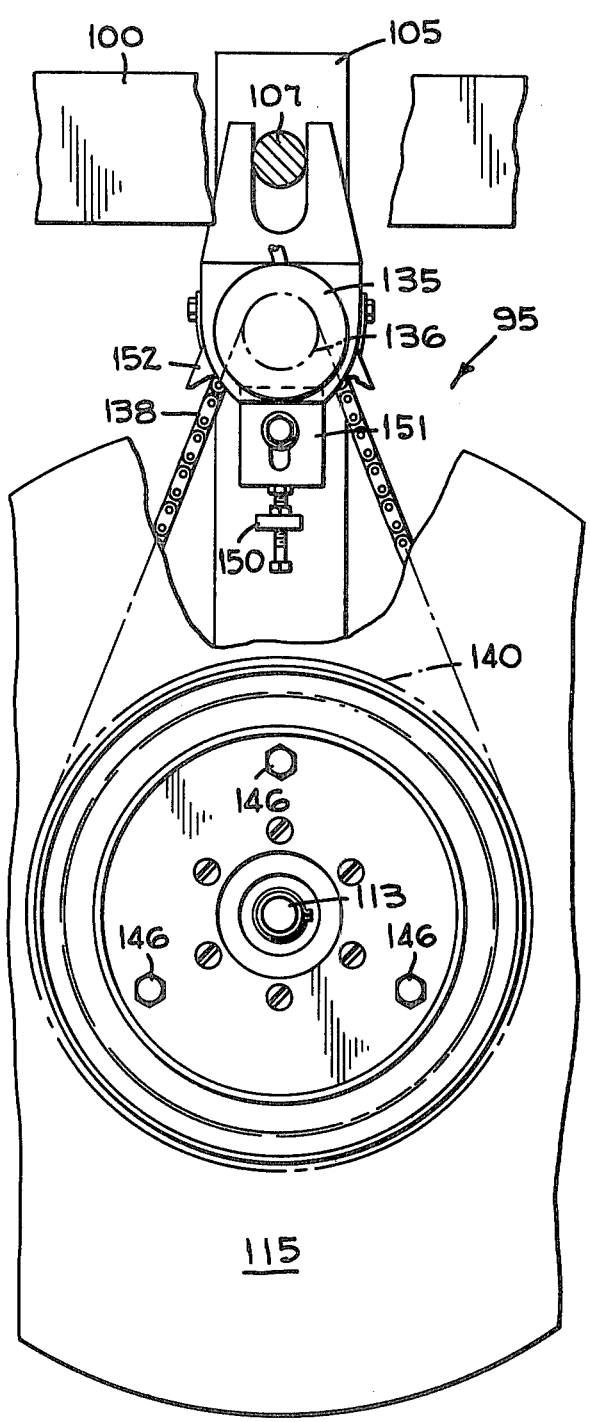

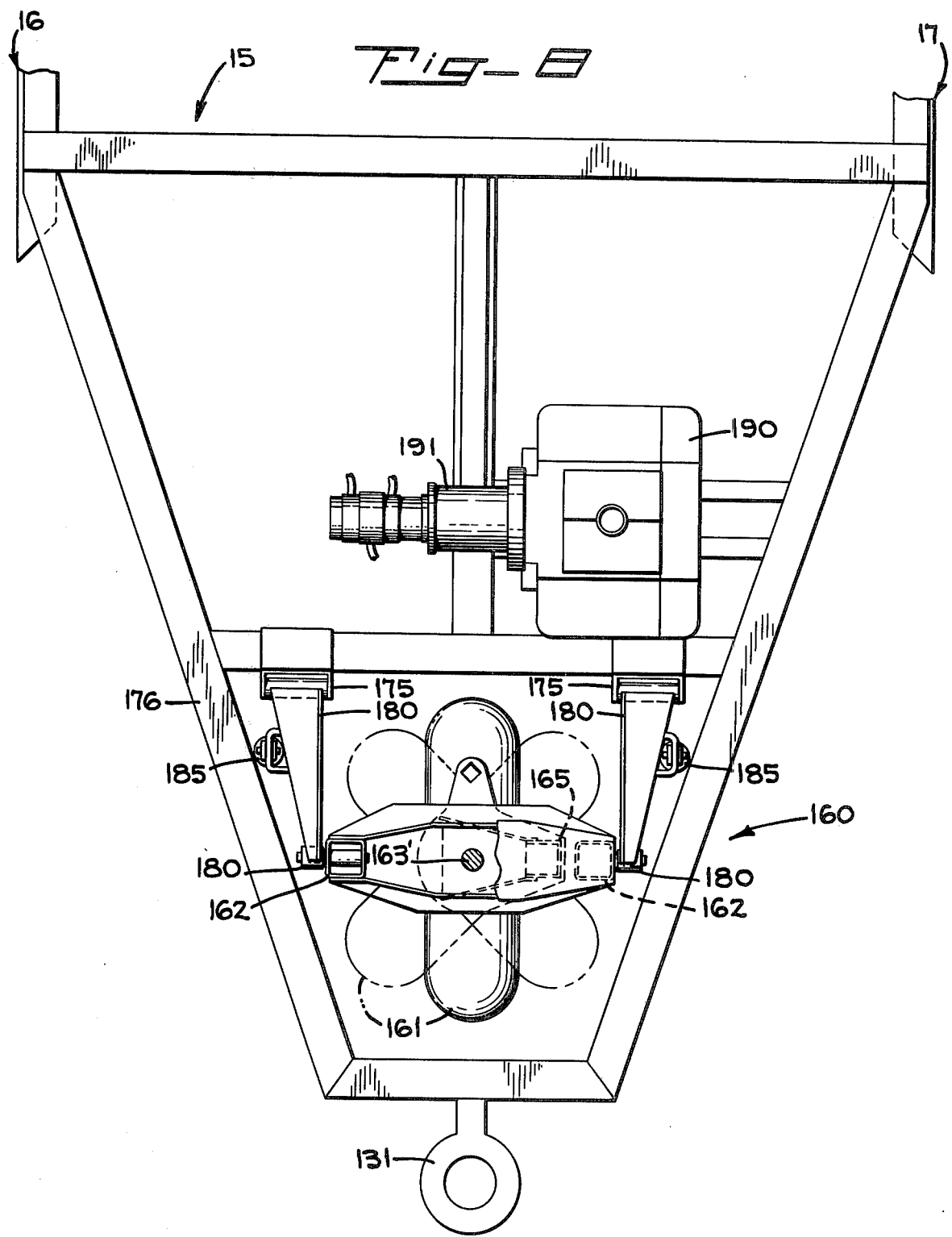

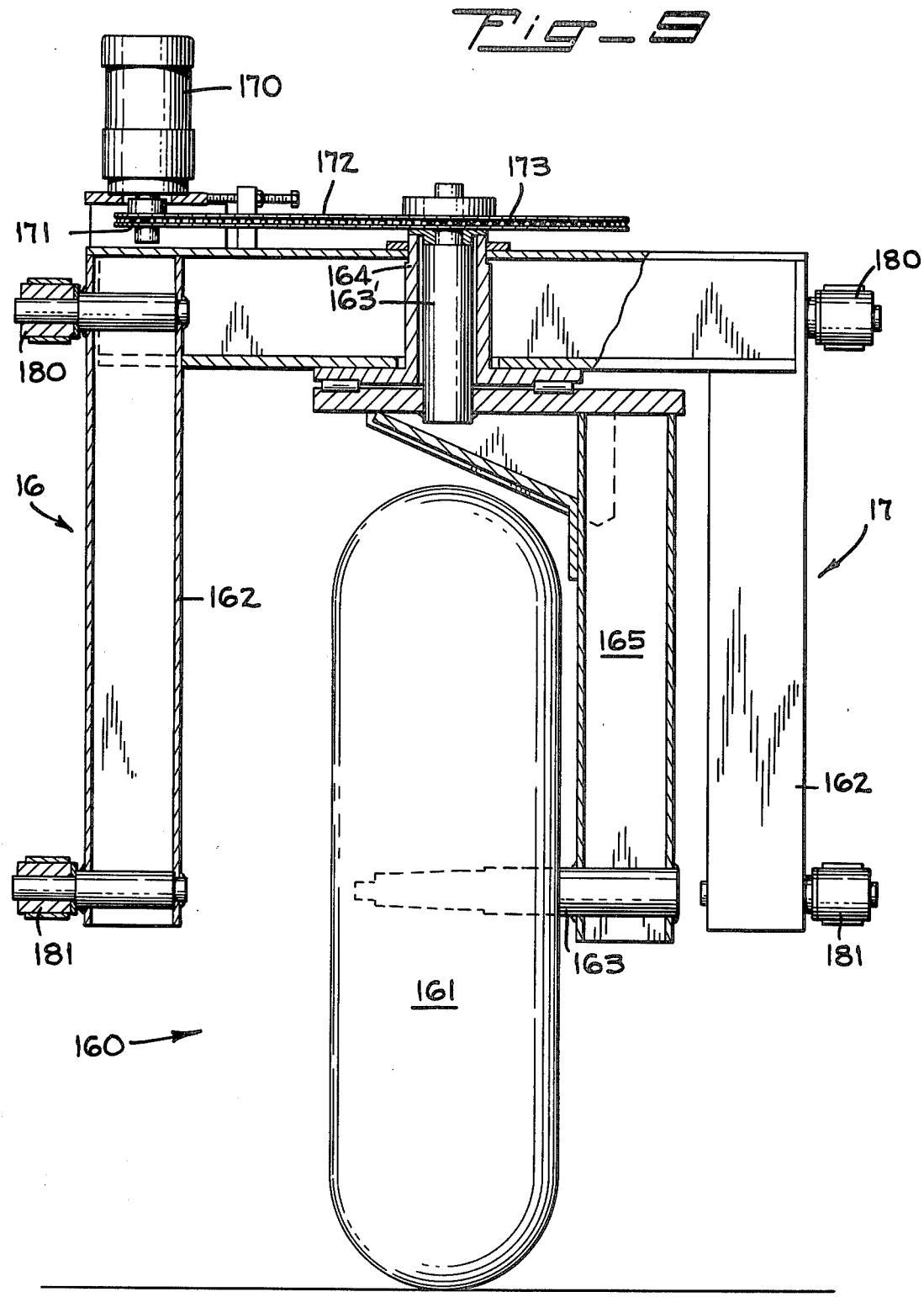

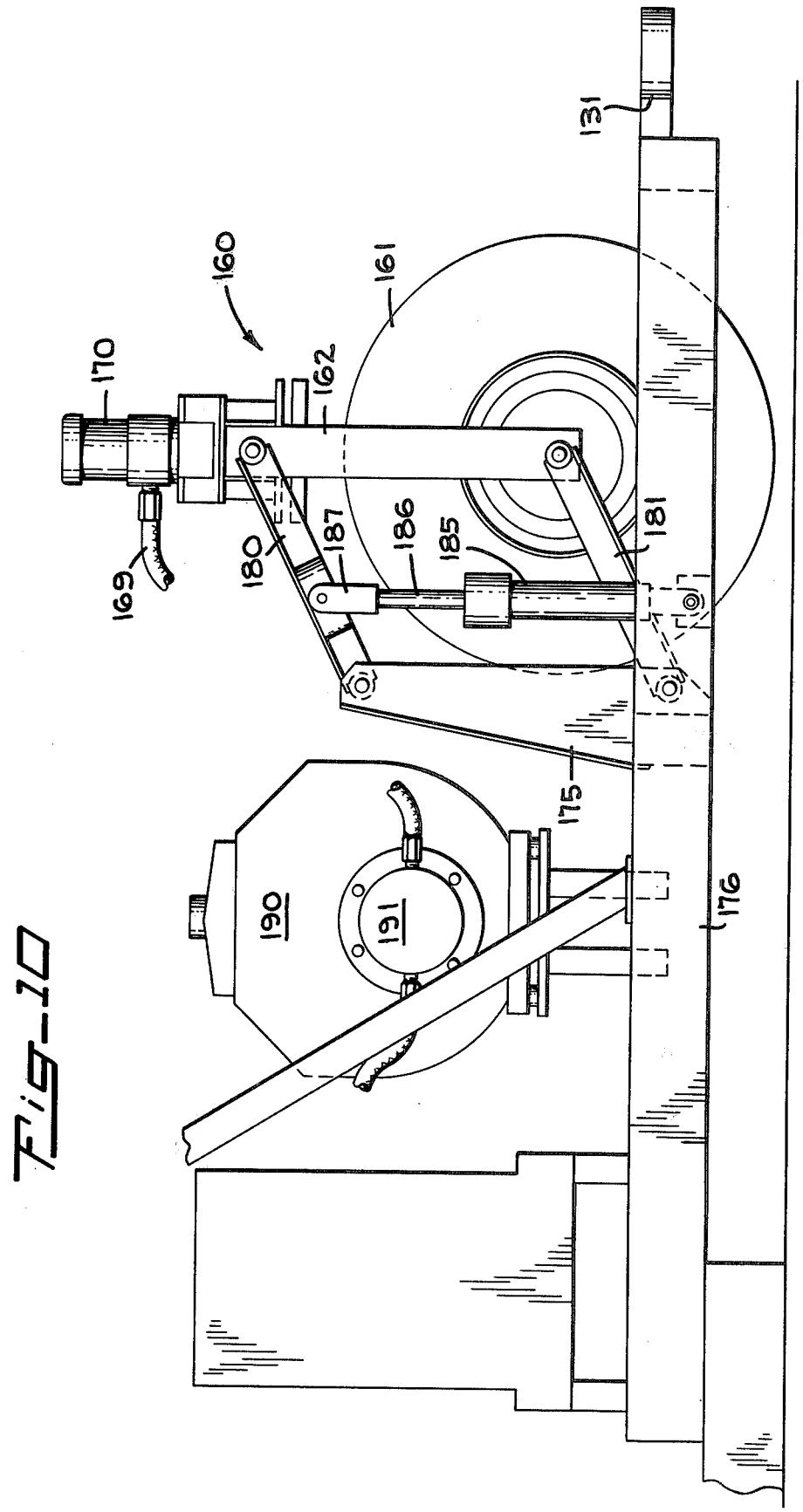

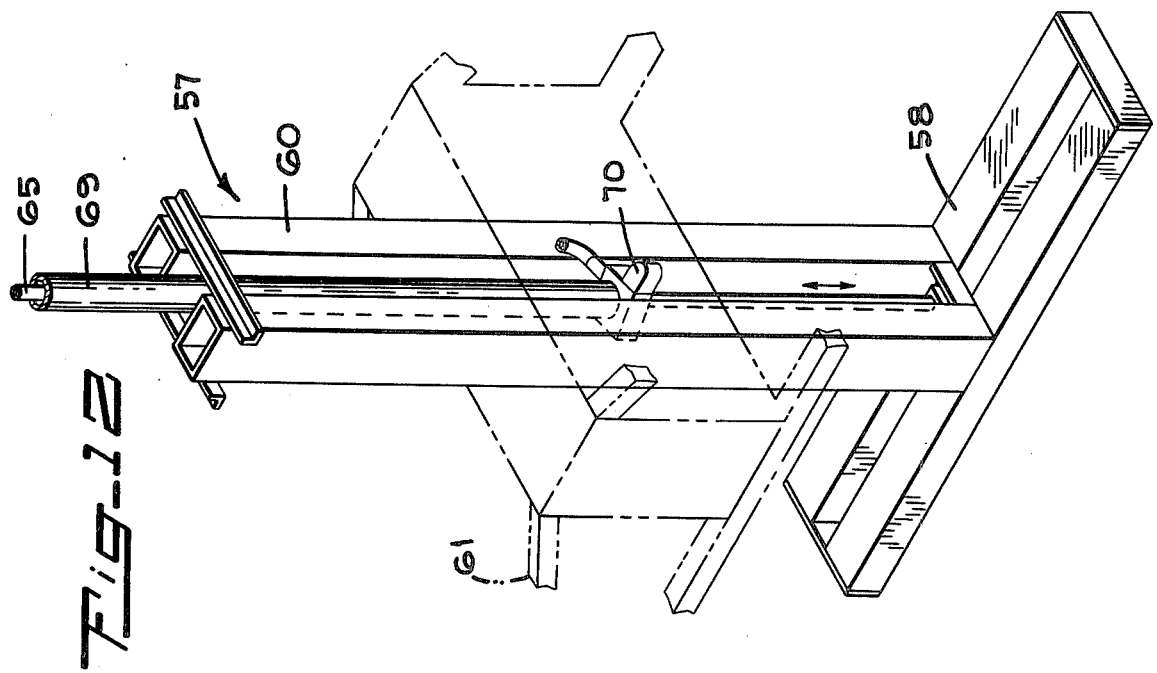
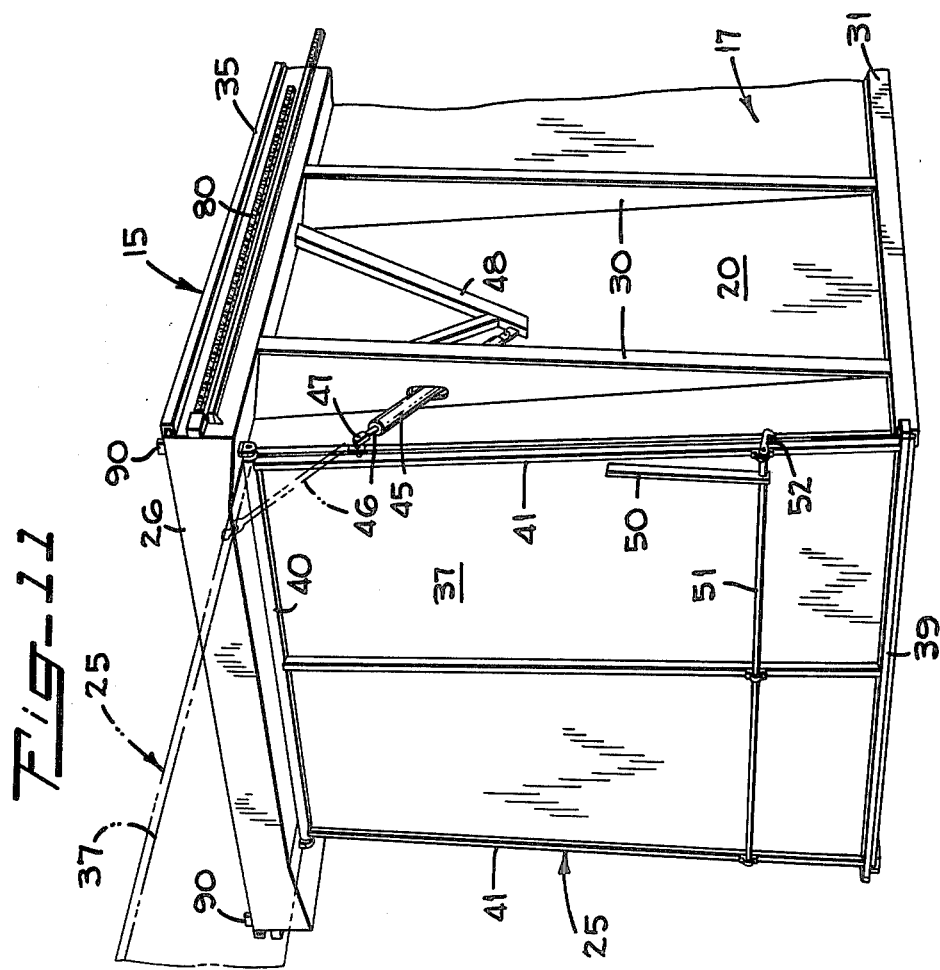

SELF-PROPELLED MODULE BUILDER

BACKGROUND OF THE INVENTION

The present invention relates in general to module builders, and more particularly to a self-propelled module builder.

In the U.S. Pat. to Orlando et al., No. 3,941,047, issued on Mar. 2, 1976, for Cotton Module Builder, the cotton module builder thereof includes a walking beam suspension on each side frame thereof. An hydraulic jack serves to raise or lower the frame of the cotton module builder relative to the ground. Attached to the ends of the walking beam are spindle tubes which are constrained for movement in a vertical plane. Spindles at the lower ends of the spindle tubes mount ground engaging wheels, respectively. Through the walking beam suspension for the wheels, the wheels constantly engage the ground during variations in the terrain of the ground. When the frame is lowered, a cotton module is deposited on a pallet to be transported to a cotton gin. When the frame is raised, the cotton module builder can be towed to another location.

The U.S. Pat. to Mailliard, No. 3,027,959, issued on Apr. 3, 1962, for Mobile Load Carrying Apparatus, discloses a walking beam wheel suspension that is rotatably mounted on a trunnion wheel. Toward this end, a walking beam includes a journal box supported by the trunnion tube and a gear housing supported by the journal box. The gear housing supports a drive motor and has a stub shaft journalled therein for rotation. A ground engaging wheel is mounted on the stub shaft.

It has been heretofore known that cotton module builders have been constructed with two drive wheels in front on a wide axle with trunnion steering.

Other patents of interest are:
Bailey U.S. Pat. No. 2,748,879
Lee et al. U.S. Pat. No. 4,074,784
Stedman U.S. Pat. No. 4,049,071
Crow, Jr. U.S. Pat. No. 4,036,304.

SUMMARY OF THE INVENTION

A self-propelled module builder in which drive wheels are suspended from a walking beam through vertically movable members. Each of the vertically movable members carries an independent drive for the drive wheel connected thereto. Thus, each drive wheel is driven by an independent drive, while the module builder retains the full action of a walking beam wheel suspension.

Heretofore, cotton module builders required a tractor to move and power the cotton module builder. This required, generally, a tractor with at least a 30 HP engine, a 1000 RPM power take-off, hydraulically operated draw bar and an hydraulic source to power two remote cylinders that raise and lower the main wheels of the module builder. The self-propelled module builder of the present invention has obviated the need of a tractor during the field operation of the module builder.

Heretofore, cotton module builders were controlled from two positions. When forming modules, the operator is on the module builder platform to control the carriage travel and the movement of the tamper. The operator controls the hydraulic system of the module builder, but does not control the engine driving the pump. Therefore, the operator sets the tractor throttle and the tractor engine operates at a constant speed. When the module has been built and the module builder is to be moved, the operator moves to the tractor as the second position. The operator thereupon disengages the power take-off drive and lifts up the front of the module builder by raising the tractor draw bar. By using the remote cylinder control, the operator will then lift up the frame of the module builder. By employing the self-propelled module builder of the present invention, these procedures have been reduced and the operation of a module builder is made simpler.

In operating the self-propelled module builder of the present invention, the movement of the module builder and the control of the engine operating the hydraulic units are accomplished from a single location. The self-propelled module builder has its own hydraulic power source.

A feature of the present invention is that movement of the drive wheels over terrain varying in contour or the raising and lowering of the frame of the module builder relative to the ground do not require a continuously operating drive chain tightener or the like. Mounting the independent wheel drive on the spindle tube or like member obviates the need for a drive chain tightener.

By having an independent drive for each drive wheel and having an operator control each pair of wheels on a side through a separate control mechanism, the drive wheels can be employed to assist in steering the module builder. The steering can be accomplished by using one pair of wheels on one side of the frame to drive the module builder and allow the module builder to turn on the other pair of wheels at the opposite side of the frame. When short turns are required, one pair of wheels on one side of the frame can be rotated in a forward direction and the other pair of wheels on the opposite side of the frame can be rotated in a reverse direction. Variations in the drive of the pairs of wheels on each side of the frame can be employed for various turning actions for the module builder.

By virtue of the present invention, the speed of the module builder can be increased substantially, when the terrain and road conditions permit, by driving one pair of drive wheels on one side of the frame. This may be accomplished in an hydraulic drive system by closing off fluid to drive motors on one side of the frame and directing all the hydraulic fluid to the drive motors on the other side of the frame.

Another feature of the present invention is the employment of rear drive wheels and a front retractable single steering wheel for the self-propelling and the steering of a module builder.

DESCRIPTION OF THE DRAWINGS

FIG. 1 is a perspective view of a module builder embodying the present invention.

FIG. 2 is a fragmentary rear perspective view of the module builder shown in FIG. 1 illustrated leaving a cotton module on a pallet.

FIG. 3 is an enlarged transverse section taken along line 3—3 of FIG. 1 looking rearwardly along the longitudinal axis of the module builder shown in FIG. 1.

FIG. 4 is a side elevation view of one of the walking beam wheel suspension assemblies for raising and lowering the module builder shown in FIG. 1.

FIG. 5 is a side elevation view of one of the walking beam suspension assemblies similar to FIG. 4 but showing the wheels in a walking position as when the module builder is traversing an incline.

FIG. 6 is a fragmentary vertical section view taken along line 6—6 of FIG. 4 to illustrate the independent drive for a drive wheel employed in the module builder shown in FIG. 1.

FIG. 7 is an elevation view of the independent drive for a drive wheel employed in the module builder shown in FIG. 1 taken along line 7—7 of FIG. 6.

FIG. 8 is a plan view of a retractable steering wheel assembly employed in the apparatus shown in FIG. 1.

FIG. 9 is a front elevation view of the retractable steering wheel assembly shown in FIG. 8.

FIG. 10 is a side elevation view of the retractable steering wheel assembly shown in FIG. 8.

FIG. 11 is a perspective view of the rear portion of the module builder illustrating the rear door in its closed (full line) and open (phantom line) positions.

FIG. 12 is an isometric view of the compacting apparatus located atop the module builder with the supporting structure therefor being shown in phantom lines.

DESCRIPTION OF THE PREFERRED EMBODIMENT

Figure 13:
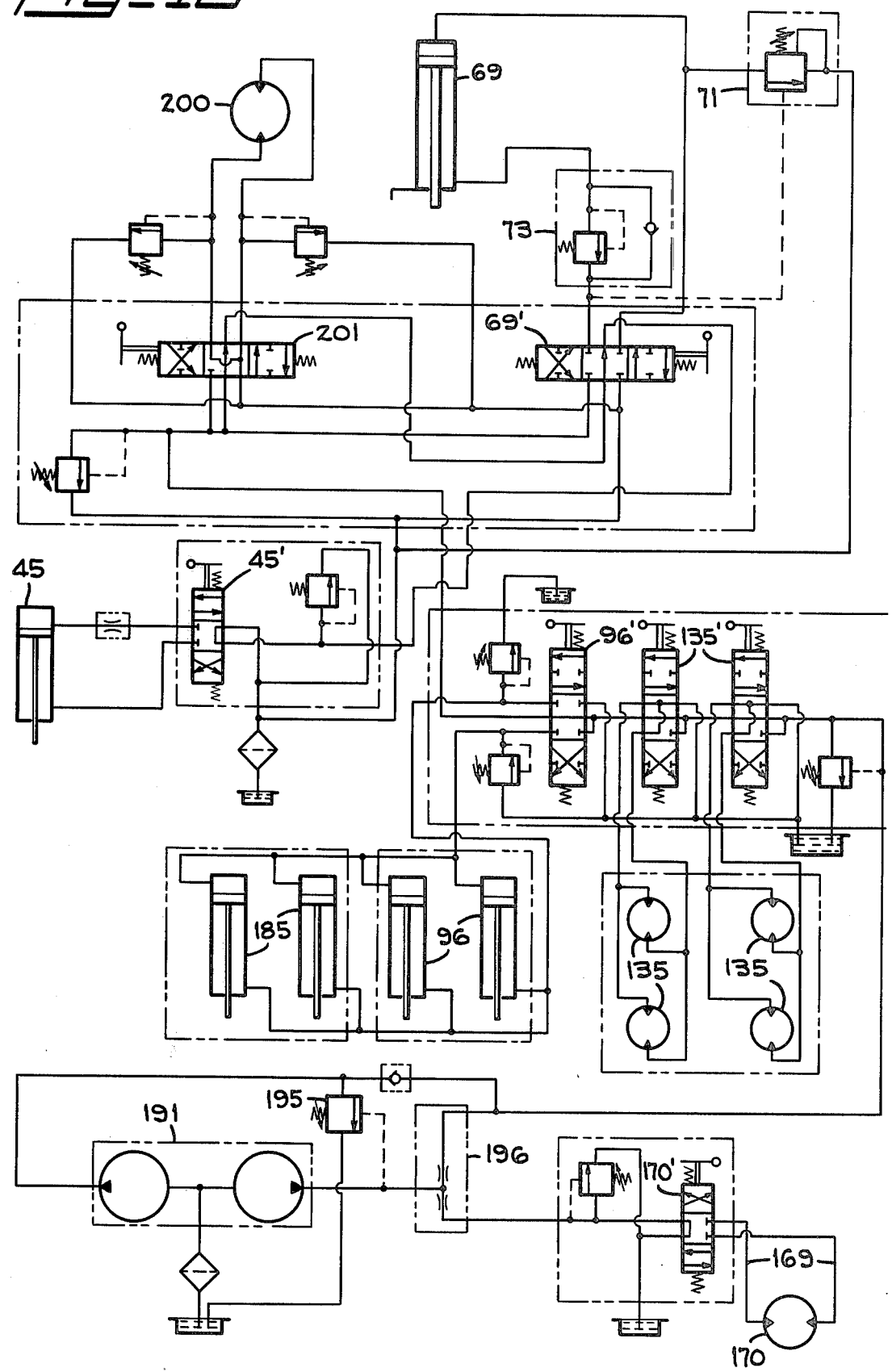
FIG. 13 is a schematic diagram of the hydraulic system of the module builder shown in FIG. 1.

Illustrated in FIG. 1 is a module builder 10 embodying the present invention which comprises a generally rectangular, open-top bin 15. The bin 15 includes side frames 16 and 17. The side frames 16 and 17 include sloping walls 20 and 21, respectively. The distance between the sloping walls 20 and 21 at the top thereof is greater than the distance between the sloping walls 20 and 21 at the bottom thereof. Interconnecting the side walls 20 and 21 at the rearward end of the cotton module builder 10 is a door 25. The door 25 is mounted for upward pivotal movement at the upper edge thereof by a closed box beam 26 acting as a header plate above the door 25. The walls of the bin 15 are preferably constructed of sheet metal with elastic stiffness sufficient to resist the lateral forces exerted upon the side walls 20 and 21 by the tamped cotton.

Each side frame 16 and 17 also includes solid web beams 30 extending outwardly of and laterally of the side walls 20 and 21 and has inner and outer flanges, respectively, for further strengthening the side walls 20 and 21 laterally. The side walls 20 and 21, as disclosed in U.S. Pat. No. 3,941,047, are formed by a plurality of separate panels, and two consecutive panels are tied together by the web beam 30 which is welded by its inner flange onto each of the adjacent panels so as to leave only a small gap between the contiguous edges of the panels. Longitudinal runners 31 of rectangular box beam cross section are located at the bottom of each of the side frames 16 and 17 and are welded to the ower edges of the side walls 20 and 21 and web beams 30 to further secure the web beams 30 and the side walls 20 and 21 together. The longitudinal runners 31 contact the ground when the bin 15 is lowered for forming a module.

Attached to each upper portion of each of the side walls 20 and 21 is a closed box beam 35 having a triangular cross-sectional area. The inner wall of each box beam 35 is sloped inwardly to direct the material deposited from above into the bin or compacting area of the module builder 10. The web beam 30 is welded to the bottom wall of the box beam 35 to further secure the web beam 30, the box beam 35 and the side walls 20 and 21 together. The box beam 35 serves to increase the torsional resistance of the side wall structure and to rigidify the module builder structure when the door 25 is in the opened position. This inhibits the binding of the door 25.

The torsional resistance of the bin 15 enhanced by the box beams 35 is preferably proportional to the total enclosed cross-sectional area of the beams 35. The torsional and bending loads are transmitted from the side wall beams 35 to the end wall beam 26 through the use of the corner construction, and cracking or buckling of the structure at the corners of the side wall beams 35 is inhibited. A detailed analysis of this construction may be found in U.S. Pat. No. 3,941,047.

A module M (FIG. 2) formed by the module builder 10 embodying the present invention may be used with a pallet P (FIG. 2) or may be used without a pallet P. When a pallet is used, the module is deposited on a pallet to be transported to a facility. When the pallet is not used, the module is deposited on the ground to be transported to a facility. When the pallet P is used, the width thereof is slightly less than the distance between the longitudinal beams 31. The pallet P may be of a convenient length, but the length thereof should be at least as long as the bed of the cotton module builder 10.

The rear door 25 (FIGS. 2 and 11) of the module builder 10 comprises a panel 37 that is disposed in a near vertical position, when closed, and bounded by and welded to a lateral runner 39 at the bottom thereof and a torsional tube 40 at the top thereof. The runner 39 and the tube 40 are welded to spaced braces 41 for additional rigidity and structural integrity. In the preferred embodiment, the tube 40 is a thick-walled cylindrical tube which functions as a hinge for the door 25 and as a torsion tube to support a portion of the door 25 and minimizes door sag when the door 25 is in the opened position.

An hydraulic jack 45 is employed to open and close the door 25. The hydraulic jack 45 includes a piston 46, which is attached to a rotatable connector 47 at one of the upper side edges of the door. The hydraulic jack 45 is mounted on a brace 48 attached to the adjacent side wall 20. The door 25 is opened for removing the module from the module builder 10 and is closed during the forming of the module in the module builder 10. A manually operated control valve 45' controls the flow of fluid under pressure in operating the hydraulic jack 45.

By using the torsion tube 40, which is capable of applying a torsional force to support the door 25, only one hydraulic jack 45 is required. The use of a single hydraulic jack 45 instead of an hydraulic jack on each side of the door 25 does not require a coordinated operation between a pair of hydraulic jacks. In the closed position, the rear door 25 is secured by a leverage bar 50 which is attached to a rod 51 that extends across the width of the door 25 and is provided at its ends with a pair of latches 52. The rod 51 is mounted for rotation and the latches 52 are arranged to engage pins on the adjacent side walls 19 and 20. The pivotal mounting for the door 25 is described in detail in U.S. Pat. No. 3,941,047. Above the door 25, the rear frame is capped by the box beam 26.

A tamper mechanism 57 is shown schematically in FIGS. 1, 3 and 12, and is a conventional mechanism. The compacting force is provided by a platen 58 formed of two solid bars which are held in parallel alignment and capped at each end by caps. The width of the individual bars is selected to produce the desired tamping pressure for the available tamping force. The tamping platen 58 is supported for vertical travel by means of a rectangular frame 60, which is guided by bearings within an A-frame structure 61 that is mounted atop the module builder 10.

The tamping platen 58 is raised and lowered by hydraulic means acting through a vertical rod 65 attached to a piston within a vertically positioned hydraulic cylinder 69 that is mounted for relative sliding movement within the frame 60 and that has a length corresponding to the vertical distance of travel of the platen 58. The lower end of the cylinder 69 is provided with a housing 70 for inflow and outflow of the hydraulic fluid. The housing 70 is provided with laterally extending ears (one only shown in FIG. 12) for releasable clamping engagement with the structure fixed to the A-frame 61. The upper end of the cylinder 69 is provided with a vertically extending fitting 72 (FIG. 1) so that the hydraulic line connection will not be forced into the frame 61 when the platen 58 is raised to its full elevated position. When the module builder 10 is traveling over a road, the ears of the cylinder 69 may be released from engagement with the A-frame 61 and the cylinder 69 is lowered with the platen 58 within the side walls 20 and 21 to allow the module builder 10 to pass under overpasses and other low-lying obstructions. The operation of the cylinder 69 is controlled by a manually operated valve 69'. A sequencing valve 71 and a counter balance valve 73 communicate with the cylinder 69 and the control valve 69'.

The supporting A-frame structure 61 is provided with four wheels 75 (FIG. 3) which move longitudinally along two rails 76. There are two wheels 75 riding along each rail 76. The rails 76 are mounted at the top outer edge of side box beams 35 of the bin 15. The wheels 75 may have an outer bevel of increased radius to cause the wheels 75 to remain on the rails 76. The wheels 75 may be made of metal or they may be made of solid rubber to reduce vibration and noise when the tamping mechanism 57 is in use or when the module builder 10 travels to another location.

An endless chain 80 is attached to brackets 81 (FIGS. 1 and 3) at each side of the A-frame structure 61. Each chain 80 has an upper run to which the A-frame 61 is attached for moving the tamping mechanism 57 longitudinally along the open top of the module builder 10 and a lower run carried by a fixed track 82. Each chain 80 is powered by a reversible motor 200 positioned behind a control panel 85 (FIG. 1) at the forward end of the module builder 10. The drive motor 200 drives a drive sprocket at the front end of each drive chain 80 by means of a laterally extending drive shaft. This arrangement is disclosed in detail in U.S. Pat. No. 3,941,047. A manually operated control valve 201 controls the operation of the reversible motor 200. As the drive shaft rotates, the drive sprockets are rotated to drive the chains 80 and to move the tamping mechanism 57 forward or backward along the rails 76. The wheels 75, which support the tamping mechanism 57, are prevented from continuing beyond the ends of the rails 76 by bumpers 90 mounted at each end of each rail 76 (FIG. 1). At the rear end of the module builder 10, each chain 80 is trained around an idler sprocket, not shown. Again, the U.S. Pat. to Orlando et al., No. 3,941,047, describes this structure in detail.

Illustrated in FIGS. 3-7 is an arrangement for raising and lowering the bin 15 relative to the ground. Toward this end, a walking beam wheel suspension assembly 95 is provided on each side of the module builder 10. Each walking beam wheel suspension assembly 95 includes an hydraulic jack 96, which is pivotally attached to its adjacent side wall, such as side walls 20 and 21, at the upper sections thereof. Each hydraulic jack 96 includes a downwardly projecting piston rod 97, which is pivotally attached at its distal end to the central portion of a walking beam 100. The walking beam 100 extends longitudinally of the bin 15. For pivotally attaching the piston rod 97 to the walking beam 100, a clevis 101 is provided. The operation of the hydraulic jacks 96 is controlled by a manually operated valve 96'.

The walking beam 100 is attached for pivotal movement at its ends to parallel, vertically disposed members 105 and 106 through pins 107 and 108. In the preferred embodiment, the vertical members 105 and 106 are spindle tubes. Each of the spindle tubes 105 and 106 are freely movable in the vertical direction and the walking beam 100 is freely pivotal at its opposite ends relative to the spindle tubes 105 and 106 while constrained to travel in the vertical direction (FIGS. 4 and 5).

The spindle tubes 105 and 106 are constrained for vertical sliding movement by parallel tracks 110 and 111, respectively. The parallel tracks 110 and 111 are fixed to a horizontal bar 112, which, in turn, is fixed between consecutive webs 30 of the adjacent side frame walls 20 and 21 located at the longitudinal center of the adjacent side frame walls 20 and 21. Suspended from the lowermost ends of the spindle tubes 105 and 106, respectively, for rotation through spindles 113 and 114 are tandem ground engaging wheels 115 and 116. There are tandem ground engaging wheels 115 and 116 at each side of the bin 15. The spindle tubes 105 and 106 are constrained to move vertically in the tracks 110 and 111 so as to allow the wheels 115 and 116 on either side to move vertically. Thus, the wheels 115 and 116 are individually arranged to move vertically relative to one another so as to permit the module builder 10 to traverse hilly or rough terrain.

While the module builder 10 is receiving material in the bin thereof to be compressed or tamped by the tamping mechanism 57 in the formation of a module, the bin 15 is lowered relative to the ground through the retracting of the piston rod 97 of the hydraulic jack 96 within the cylinder thereof. After the bin 15 is fully seated on the ground, the continuation of the retracting of the piston 96 into the cylinder thereof retracts the wheels 115 and 116 by the elevating or lifting of the spindle tubes 105 and 106.

After the module is fully compressed and formed, the door 25 is opened and the wheels 105 and 106 are lowered to engage the ground by the extending of the piston rod 96 from its cylinder. After the wheels 105 and 106 engage the ground, the continued extension of the piston rod 97 from its cylinder lifts the bin 15 above the ground to a sufficient height to clear the top of the bin 15 from engagement with the module. Now, the module builder 10 travels forwardly to another location leaving in a longitudinal direction the module M to exit from the rear door 25. The module M can be deposited either on the ground or on a pallet P.

The vertical orientation of the piston rod 97 is fixed relative to the side walls 20 and 21 of the bin 15 so that each pair of tandem wheels 115 and 116 effectively pivots about the associated connecting pin in the clevis 101 at the end of the piston rod 97. The wheels 115 and 116 at each side of the module builder 10 move independently of one another as the pairs are independently suspended. The longitudinal center line of each hydraulic jack 96 generally coincides with the vertical plane through the center of each of the wheels 115 and 116. Through this arrangement, bending stresses in the side walls 20 and 21 of the bin 15 are minimized by transmitting the vertical force of the weight of the module builder 10 from the hydraulic jack 96 directly through the wheels 115 and 116 to the ground.

The side walls 20 and 21 of the bin 15 directly over the wheels 115 and 116 are reinforced with gussets 120, each of which serves to mount the upper end of the underlying hydraulic jack 96 by means of an anchor plate 121. The anchor plate 121 is rotatably secured to the end of the jack 96. Each gusset 120 comprises a triangular cross-sectional area with the anchor plate 121 welded to the lower wall thereof (FIG. 3). The other walls of the gusset 120 are welded to the lower wall of the overlying box beam 35. The gussets 120 span the distance between the web beams 30 located at the center of the side frames 20 and 21, respectively. A reinforcing plate 122 is enclosed within the walls of each of the gussets 120 in the plane of the associated hydraulic jack 96 to strengthen the gusset at its point of highest stress. Two separate and spaced plates 123 are enclosed within and welded to the interior walls of the triangular box beams 35 forming the upper side wall structures of the module builder 10. The plates 123 are vertically oriented and are located just above the two web beams 30 at the center of each side of the side walls 20 and 21 to strengthen the bin 15 at these stress points. The plates 123 may be enclosed within the box frame 35 at other points along the length of the module builder 10 where extra strengthening is desirable.

The upper portion of the front end of the module builder 10 is also provided with a box beam 125 (FIG. 1) having a triangular cross-sectional area. The box beam 125 is similar to the rear box beam 26 and is rigidly fixed to the side box beams 35 in a manner similar to the joining of the box beam 26 to the side box beams 35. The outer wall of the box beam 125 has the control panel 85 mounted thereon. Ladders 126 are fixedly disposed at the forward end of the module handler 10. A suitable seat 127 for the operator is disposed on a platform 128. From the platform 128, the operator can observe the entire bin 15 in which material is deposited for compression into a module.

According to the present invention, each wheel 115 and 116 is independently driven by an associated motor 135 (FIGS. 3-7). Fixed to the drive shaft of the motor 135 is a drive sprocket 136. The motor 135 is mounted on the adjacent spindle tube 105 and 106 for movement therewith. There is a motor 135 mounted on each spindle tube 105 and 106, respectively. Trained around the drive sprocket 136 is a drive chain 138. The drive chain 138 is also trained around a driven sprocket 140. The driven sprocket 140 is welded to the hub 141 of the wheels 115 and 116, respectively, to impart rotation thereto. In turn, rotation of the hub 141 imparts rotation to the wheels 115 and 116, respectively. Sleeve bearings 145 are disposed between the sprockets 140 and the spindles 113 and 114 to serve as a support bearing for the sprockets 140. The operation of each pair of motors 135 is controlled respectively by a manually operated control valve 135′.

Bolts 146, when engaged with the hub 141, lock the wheels 115 and 116 to the hubs 141, respectively, so that operation of the motors 135 will rotate the wheels 115 and 116 through the respective sprocket drives. When the bolts 146 are removed, the wheels 115 and 116 are free wheeling and rotate about their own bearing. This occurs when the module builder 10 is being towed by a tractor.

A chain tightener or tension adjuster 150 is provided for each wheel 115 and 116, which is also mounted on the adjacent spindle tube 105 and 106. Toward this end, a motor mounting plate 151 is adjustably movable along the axis of the adjacent spindle tube 105 and 106 and has the adjacent motor 135 fixed thereto. Thus, adjustably positioning the plate 151 along the associated spindle tube 105 and 106 adjusts the tension of the associate chain 138. A suitable chain guard 152 is disposed between the associated wheel 115 and 116 and the associated sprocket drive. More specifically, the motor mounting plate 151 has the housing of the adjacent motor 135 fixed thereto. In turn, the motor mounting plate 135 is supported by a nut and bolt arrangement to its associated spindle tube 105 and 106.

Thus, each wheel 115 and 116 is driven independently, while the module builder 10 retains the full action of the walking beam suspension 95. When the wheels 115 and 116 are retracted, there is no need for a chain tightener. Regardless of the position of the wheels 115 and 116, the center-to-center distance of the motors 135 and the drive wheels 115 and 116 remains constant.

For steering the module builder 10, a retractable steering wheel assembly 160 (FIGS. 1 and 8-10) is mounted at the front end of the module builder 10. The steering wheel assembly 160 comprises a retractable steering wheel 161. A yoke 162 supports the wheel 161 for rotation through a horizontally disposed spindle 163. The spindle 163 is carried by a suitable right angular spindle bracket 165. The right angular bracket 165 is rotatable about a vertical axis through a vertically disposed shaft 163′, which is journalled for rotation within a bearing sleeve 164. The bearing sleeve 164, in turn, is fixed to the horizontal component of the yoke 162. Thus, the yoke 162 mounts the bearing sleeve 164 to support the spindle bracket 165 for steering about a vertical axis through the shaft 163′. Through this arrangement, the steering wheel 161 is supported for rotation about a horizontal axis and for steering movement about the vertical axis of the shaft 163′.

For imparting a steering movement to the steering wheel 161, hydraulic lines 169 are connected to an hydraulic motor 170. The hydraulic motor 170 has a drive sprocket 171 connected to its output shaft. Entrained around the drive sprocket 171 is an endless chain 172. The endless chain 172 is trained around a driven sprocket 173, which is fixed to the shaft 163′ to impart rotation thereto. The hydraulic fluid flowing through the hydraulic lines 169 is controlled at the panel 85 by an operator for steering the module builder 10. The operation of the motor 170 is controlled by a manually operated valve 170′.

For raising and lowering the yoke 162, transversely spaced posts 175 are fixed to a horizontally disposed frame 176 below the platform 128. Interconnecting the upper end of each fixed post 175 and the adjacent leg of the yoke 162 is an arm 180. The arm 180 is pivotally connected to the associated post 175 and is pivotally connected to the associated leg of the yoke 162. In parallel with the arm 180 is an arm 181 that is pivotally connected to the lower end of the post 175 and is pivotally connected to the lower end of the adjacent leg of the yoke 162. An hydraulic jack 185 is pivotally connected to the horizontal frame 176 and has its piston 186 pivotally connected to the adjacent arm 180 intermediate the ends thereof by a clevis 187.

Hydraulic lines are connected to the jacks 185 to supply fluid under pressure thereto from the source of fluid under pressure. An operator controls the operation of the hydraulic jacks 185 from the control panel 85 through the manually operated control valve 96′. By raising and lowering the pistons 186 in unison, an operator can raise and lower the frame 176 relative to the steering wheel 161 while the wheel 161 engages the ground. The wheel 161 is retracted by continued lifting movement of the pistons 186 after the frame 176 is supported by the vehicle for the towing of the module builder 10 and the frame 176 can be elevated to a height so that a hitch 131 can be aligned with the pintle of the towing vehicle. When the module builder is self-propelled, the wheel 161 is lowered to engage the ground for steering the module builder 10. For towing, the module builder 10 is equipped with a lunette and the towing vehicle is equipped with a pivotal hook.

Mounted on the frame 176 is a suitable engine, such as a gasoline or diesel engine 190, which drives a tandem hydraulic pump 191. The tandem hydraulic pump 191 provides fluid under pressure through suitable hoses. The hydraulic pump 191 provides fluid under pressure to operate the hydraulic motors 135 of the walking beam suspension assemblies 95. Controls on the control panel 85 serve to control the operation of the wheels 115 and 116.

From the control panel 85, the operator can control the operation of the tamping mechanism 57, the cylinder for raising and lowering the door 25, the hydraulic jacks 96 for the walking beam suspensions 95, and the reversible hydraulic motor 200 for controlling the longitudinal movement of the tamping mechanism 57. Hoses from the pump 191 provide the power for the various hydraulic mechanisms and the reversible motor.

Retraction and steering of the steering wheel 161 is controlled from the panel 85. Thus, it is easy for the operator to safely hook to the towing unit. Height of the lunette eye is controlled by either retracting or extending the steering wheel 161. Once aligned, the operator moves the tractor forward and makes the hook-up. Once this is accomplished, the steering wheel 161 is retracted.

From the foregoing, it is to be observed that the source of hydraulic power 190 operates the module builder 10 for forming modules M. It also supplies hydraulic power for the drive wheels 115 and 116 to propel the module builder 10. Power is derived from this source for raising and lowering the module builder 10 relative to the ground and for steering the steering wheel 161. All of these operations are controlled by the operator from platform 128.

Included in the hydraulic system (FIG. 13) is a remote sequence valve 195, a flow divider 196 and a check valve 197.

We claim:

1. A self-propelled module builder comprising:
  (a) a bin in which material is deposited having side walls;
  (b) a tamping mechanism on said bin for compressing material deposited in said bin for forming a module;
  (c) a walking beam mounted on each of said side walls;
  (d) a depending member pivotally attached to each end portion of each walking beam;
  (e) a vertical guide for each depending member whereby each depending member is constrained for movement in a vertical direction while each walking beam is freely pivotable at each end thereof;
  (f) a ground engaging drive wheel mounted on the lower end of each of said depending members for rotation;
  (g) a drive motor mounted on each of said depending members;
  (h) drive means interconnecting each drive motor with its adjacent ground engaging drive wheel for imparting rotation thereto; and
  (i) means connected to said drive motors for operating said drive motors to propel the module builder.

2. A self-propelled module builder as claimed in claim 1 and comprising lifting means mounted on each side of said bin, each of said lifting means including a depending actuator pivotally connected to its adjacent walking beam, and means for operating each of said lifting means for raising and lowering said depending actuator thereof to raise and lower said bin relative to the ground and for retracting said drive wheels.

3. A self-propelled module builder as claimed in claim 2 wherein each of said drive motors is an hydraulic motor.

4. A self-propelled module builder as claimed in claim 3 wherein each of said drive means comprises a drive sprocket driven by its associated drive motor, a drive chain entrained around each of said drive sprockets, and a driven sprocket driven by each of said drive chains and connected to the adjacent drive wheel to impart rotation thereto.

5. A self-propelled module builder as claimed in claim 4 wherein each of said lifting means is an hydraulic jack and each of said depending actuators is a piston.

6. A self-propelled module builder as claimed in claim 5 and comprising a hub connected to its adjacent driven sprocket for rotation therewith, and fastening means for detachably securing each of said drive wheels to its adjacent hub, said driven sprocket rotates its adjacent drive wheel when the adjacent drive wheel is secured to its adjacent hub and said drive wheels being free wheeling when detached from its associated hubs.

7. A self-propelled module builder as claimed in claim 1 and comprising a steering ground engaging wheel at the forward end of said module builder for steering said module builder.

8. A self-propelled module builder as claimed in claim 7 and comprising steering means at the forward end of said module builder supported for rotatable movement about a vertical axis and mounting said steering wheel for rotation about its horizontal axis.

9. A self-propelled module builder as claimed in claim 8 and comprising a steering motor mounted on said steering means, and drive means interconnecting said steering motor and said steering means for rotating said steering means about said vertical axis to impart a steering movement to said steering wheel about said vertical axis.

10. A self-propelled module builder as claimed in claim 9 wherein said steering means includes a yoke, said module builder further comprising a horizontal frame extending forwardly from said bin, transversely spaced posts mounted on said horizontal frame, vertical spaced parallel arms pivotally attached to said posts and the adjacent legs of said yoke, and an hydraulic jack pivotably attached to the upper arms of said vertically spaced parallel arms for raising and lowering said horizontal frame relative to the ground and for retracting said steering wheel.

11. A self-propelled module builder as claimed in claim 10 and comprising a source of fluid under pressure mounted on said frame, and means for conducting fluid under pressure from said source of fluid under pressure to said drive motors for imparting rotation to said drive wheels, to said hydraulic jacks for raising and lowering said bin, to said steering motor for steering said steering wheel, to said hydraulic jack for raising and lowering said horizontal frame, and to said tamping mechanism for operating said tamping mechanism 12. A self-propelled module builder as claimed in claim 11 and comprising a platform disposed above said horizontal frame, and control means at said platform for controlling the impartation of rotation to said drive wheels, for controlling the raising and lowering of said bin, for controlling the steering of said steering wheel, for controlling the raising and lowering of said horizontal frame, and for controlling the operation of said tamping mechanism.

* * * * *